(12) United States Patent
Choy et al.

(10) Patent No.: US 7,348,829 B2
(45) Date of Patent: Mar. 25, 2008

(54) SLEW RATE CONTROL OF A CHARGE PUMP

(75) Inventors: Jon S. Choy, Austin, TX (US); Tahmina Akhter, Austin, TX (US)

(73) Assignee: Intersil Americas Inc., Milpitas, CA (US)

( * ) Notice: Subject to any disclaimer, the term of this patent is extended or adjusted under 35 U.S.C. 154(b) by 34 days.

(21) Appl. No.: 11/388,396

(22) Filed: Mar. 24, 2006

(65) Prior Publication Data

US 2007/0222498 A1  Sep. 27, 2007

(51) Int. Cl.
*G05F 1/10* (2006.01)
(52) U.S. Cl. .................................. 327/536; 365/185.18
(58) Field of Classification Search ................ 327/536; 365/185.18, 185.19, 185.29, 185.33
See application file for complete search history.

(56) References Cited

U.S. PATENT DOCUMENTS

| 5,168,174 A * | 12/1992 | Naso et al. ................. 327/540 |
| 5,365,121 A * | 11/1994 | Morton et al. .............. 327/170 |
| 5,945,870 A | 8/1999 | Chu et al. |
| 6,515,903 B1 | 2/2003 | Le et al. |
| 6,628,151 B1 | 9/2003 | Zhou et al. |
| 6,724,241 B1 * | 4/2004 | Bedarida et al. ............ 327/536 |
| 6,760,262 B2 | 7/2004 | Haeberli et al. |
| 6,853,582 B1 * | 2/2005 | Matsuda et al. ....... 365/185.18 |
| 6,937,517 B2 * | 8/2005 | Pekny et al. .......... 365/185.18 |
| 2003/0161171 A1 | 8/2003 | Haeberli et al. |
| 2004/0012436 A1 | 1/2004 | Pekny et al. |
| 2004/0228189 A1 | 11/2004 | Cheung |

\* cited by examiner

*Primary Examiner*—Kenneth B. Wells
(74) *Attorney, Agent, or Firm*—Gary R Stanford

(57) ABSTRACT

A charge pump system including a clock circuit and a charge pump circuit is provided. The clock circuit provides a first clock with a frequency based on a memory block select signal indicative of load capacitance of a charge node. The charge pump circuit receives the first clock and charges the charge node at a rate based on the frequency of the first clock and the load capacitance of the charge node. The memory block select signal indicates which of the memory blocks are coupled to the charge node and thus indicates the load capacitance of the charge node. The frequency of the first clock is adjusted based on the load capacitance of the selected block so that the slew rate of the charge node is about the same. Thus, the slew rate of the voltage ramp on the charge node is about the same regardless of the load capacitance.

17 Claims, 4 Drawing Sheets

SLEW RATE CONTROL OF A CHARGE PUMP

BACKGROUND OF THE INVENTION

1. Field of the Invention

The present invention relates in general to floating gate non-volatile memories, and more specifically to slew rate control of a charge pump that develops a voltage used for erasing and programming of floating gate non-volatile memories.

2. Description of the Related Art

Floating gate non-volatile memories such as erasable programmable read only memories (EPROMs), electrically erasable programmable read only memories (EEPROMs), block erasable ("flash") EEPROMs, and one time programmable read only memories (OTPROMs) are typically used for many electronic applications such as automotive control, consumer products, etc. The state of each memory cell of a floating gate memory block is determined by the amount of charge stored on a floating gate. The floating gate is isolated from an underlying channel by a region of tunnel oxide. Typically, the floating gate transistor is programmed and erased by processes known as hot carrier injection and Fowler-Nordheim tunneling, respectively. One process that uses Fowler-Nordheim tunneling for erasing a flash memory is called "channel erase".

A typical flash memory cell manufactured using a "triple well" process may have five terminals that must be properly biased for program and erase operations: a control gate, a source, a drain, a P-well terminal, and a deep N-well terminal. An array of flash memory cells is formed in the P-well. The P-well is isolated within the deep N-well. One technique for performing a channel erase operation on, the memory cells of the flash memory array involves applying a relatively high negative voltage, for example about −9 volts, to the control gate, while applying a relatively high positive voltage, for example about +9 volts, to the P-well and the deep N-well.

A typical memory device integrated onto a chip (e.g., integrated circuit or "IC") includes multiple blocks of memory arrays of various sizes, such as, for example, one or more of each of a 16 kilobyte (KB) block, a 64 KB block, a 128 KB block, etc. A charge pump or the like is often used to drive the erasure voltage to each cell of one or more selected memory blocks on the IC to perform an erase operation. The output of the charge pump ramps to the selected voltage level at a slew rate based on a given clock frequency and as regulated by a feedback loop including a comparator or the like. As understood by those skilled in the art, each memory cell presents a capacitance to the output of the charge pump, and the combined capacitive load depends on which of the memory blocks are selected for the erase operation. A smaller memory block presents less capacitive load than a larger memory block even though the same charge pump circuit is typically used to erase either one at different times (or both at the same time). Since the output of the charge pump ramps from an initial voltage level (e.g., 0 V) to the same target voltage based on a given clock frequency, it takes longer for the charge pump circuit to achieve the target voltage level for the larger blocks. For example, a 128 KB memory block presents 8 times the capacitive load as a 16 KB memory block, so that it takes longer for the charge pump to achieve the target voltage for the 128 KB memory block.

The frequency of the clock signal is selected based on the largest memory block to be erased on the chip to achieve a given performance level (e.g., performance based on the amount of total time to complete the erase operation). Also, the response time of the comparator circuit used to control the charge pump regulated output is determined based on the allowable overshoot voltage for the largest memory block. Based on these conventional design constraints, the charge pump circuit is able to achieve the erase voltage significantly faster for the smaller memory blocks. It has been discovered, however, that if the voltage charges too quickly, then the charge pump output overshoots the target voltage by a substantial amount. The erase voltage of the typical memory cell is relatively close to its breakdown voltage, such as within 5%, so that an overshoot of more than 5% cannot be tolerated as it destroys the memory cells within the block.

It is possible to use a more sophisticated control circuit and/or a more complicated comparator circuit to avoid catastrophic failure of the memory device during the erase operation. Yet this first solution overly complicates the charge pump circuit and significantly increases the expense of the IC. Alternatively, it is possible to add a very large stability capacitor to the charge pump circuit. The additional stability capacitor also adds undue expense, consumes valuable space in the memory design, and negatively impacts desired performance levels.

It is desired to provide a charge pump circuit which achieves the target erase voltage for any and all selected memory blocks using a relatively simple and slow response comparator circuit without risking catastrophic failure of the of the chip.

BRIEF DESCRIPTION OF THE DRAWINGS

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
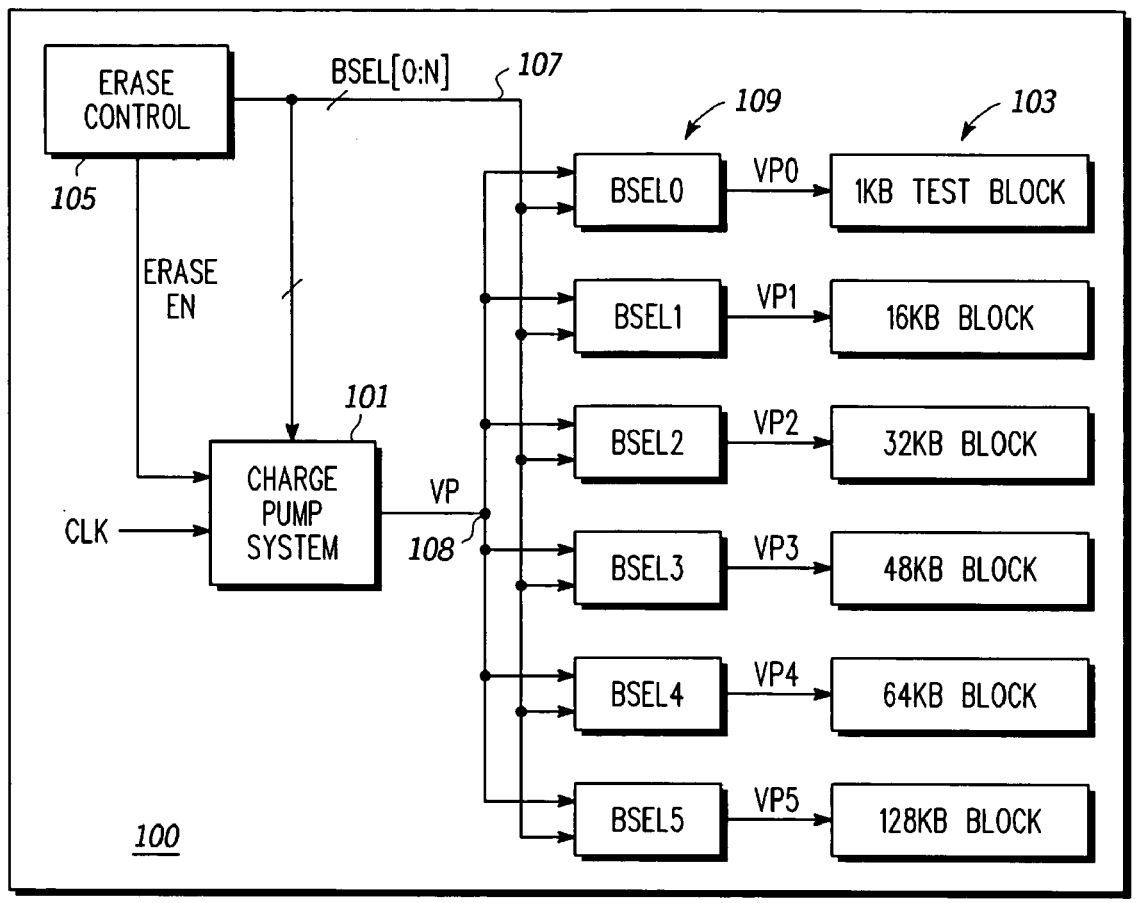
FIG. 1 is a simplified block diagram of a memory system including a charge pump system implemented according to an embodiment of the present invention.

FIG. 1 is a simplified block diagram of a memory system 100 including a charge pump system 101 implemented according to an embodiment of the present invention. In one embodiment, the memory system 100 is integrated onto a memory chip or IC as known to those skilled in the art. The memory system 100 includes multiple memory blocks 103, each implemented as an array of floating gate non-volatile memory cells, such as EPROMs, LEPROMs, OTPROMs, or the like. Each memory block 103 is an array of memory cells having a particular size based on the number of memory cells included. As shown, the memory blocks 103 include a 1 kilobyte (KB) test block, a 16 KB block, a 32 KB block, a 48 KB block, a 64 KB block, and a 128 KB block. The illustrated configuration (number and respective sizes) of the series of memory blocks 103 is exemplary only and it is understood that many different variations are possible and contemplated. For example, any given block or block size may be omitted or repeated in a given configuration and other block sizes are contemplated as well. Yet most configurations include at least two blocks with a significant variance in size, such as by a factor of 4, 8, 16, etc. Furthermore, most memory devices include at least one test block that is significantly smaller than the largest block on the chip (e.g., by a factor of 128 or 256 or the like).

The memory system 100 includes erase control logic 105, which provides respective signals of a block select (BSEL) bus 107 and an erase enable signal ERASE EN to the charge pump system 101. The charge pump system 101 receives a clock signal CLK and outputs a charge pump voltage VP on a voltage or charge node 108. The BSEL bus 107 includes a number "N+1" of signals as shown (e.g., BSEL[0:N]), where N is a positive integer greater than zero. The BSEL bus 107 is routed to each of an array of six block select switches 109, individually labeled BSEL0, BSEL1, ..., BSEL5. Although six block select switches 109 and a corresponding six memory blocks 103 are illustrated, it is understood that the system may include any practicable number of block switches and memory blocks (more or less than the six shown). In one embodiment, the BSEL[0:N] signals are encoded and all are routed to each of the block select switches 109, where each decodes the BSEL[0:N] signals to determine whether it is selected or not. Alternatively, each of the BSEL[0:N] signals is routed to a respective one of the block select switches 109 for individually selecting the memory blocks 103 (e.g., N=5 in which the BSEL0 signal is routed to the BSEL0 block, the BSEL1 signal is routed to the BSEL1 block, etc.). The VP signal is routed via charge node 108 to an input of each of the block select switches 109, which provide respective ones of pulse voltage signals VP0, VP1, ..., VP5 to respective ones of the memory blocks 103. In this manner, the erase control logic 105 asserts the BSEL[0:N] signals to enable one or more of the block select switches 109 for selecting corresponding ones of the memory blocks 103 to perform an erase operation. Also, the erase control logic 105 asserts the ERASE EN signal to initiate the erase operation, where the enabled ones of the block select switches 109 pass the VP signal as corresponding ones of the VP0-VP5 signals to facilitate erasure of the selected memory blocks 103.

Figure 2:
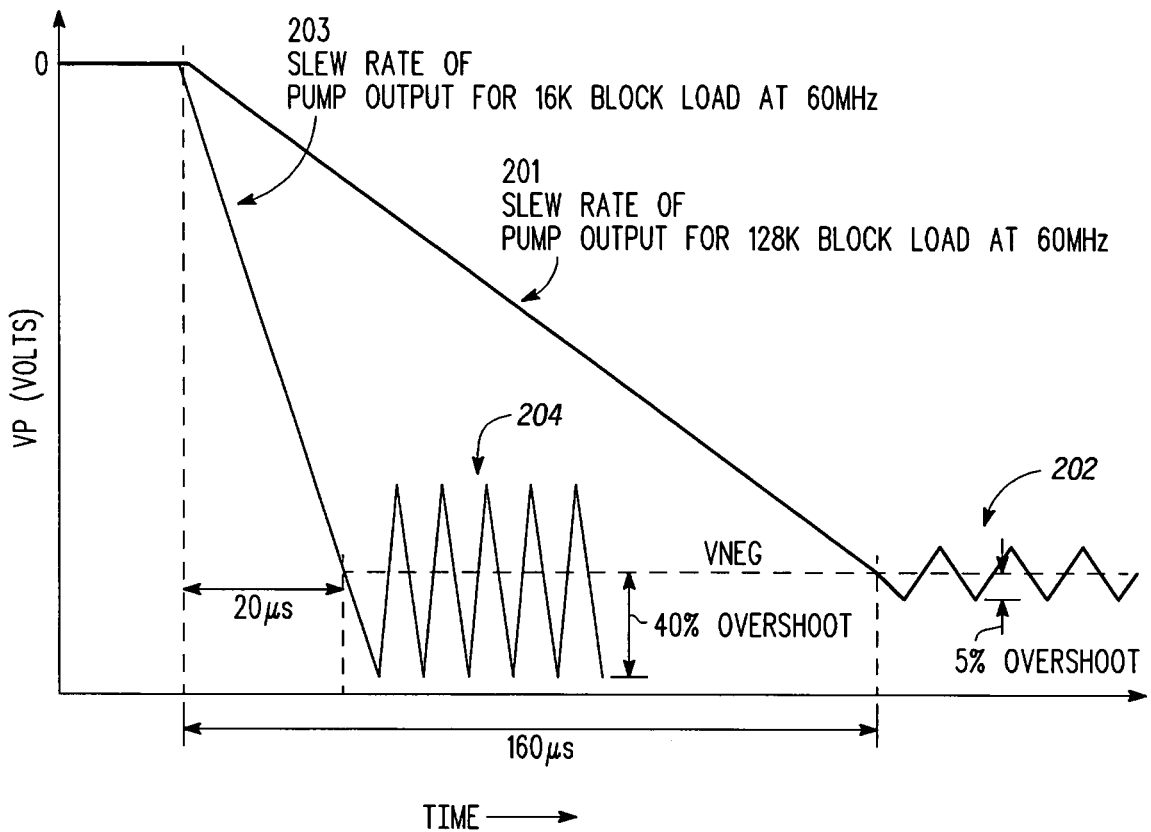
FIG. 2 is a simplified graphic diagram illustrating the slew rate (negative slope) of the VP signal for memory block sizes of 16 KB and 128 KB at a selected clock frequency of PCLK=60 megahertz (MHz)

FIG. 2 is a simplified graphic diagram illustrating the slew rate (negative slope) of the VP signal for memory block sizes of 16 KB and 128 KB at a selected clock frequency of PCLK=60 megahertz (MHz). As shown by curve 201, the VP signal ramps down from approximately 0 V to a target voltage level VNEG in about 160 microseconds (µs) for the 128 KB memory block at the selected clock frequency. In this illustrated embodiment, the capacitance of the 128 KB memory block is 656 picofarads (pF). As shown at 202, curve 201 overshoots the target voltage only by about 5% and settles down at the target voltage level without exceeding the breakdown voltage of the memory cells of the 128 KB memory block.

The 128 KB memory block is about 8 times the size of the 16 KB memory block, which has a combined capacitance of only about 82 pF. If the same charge pump configuration, comparator design and clock frequency is used for the 16 KB memory block as shown by curve 203, the slew rate of the VP signal is significantly increased so that the VP signal reaches the target voltage level of VNEG about 8 times faster, or within approximately 20 µs. Because of the relatively simple design of the comparator of the charge pump, described further below, the curve 203 overshoots the target voltage by a substantial amount (e.g., approximately 40%) as shown at 204. This is an undesirable result since the absolute value of the VP voltage rises well above the breakdown voltage level of the cells of the 16 KB memory block, potentially causing catastrophic failure of the memory device.

Figure 3:
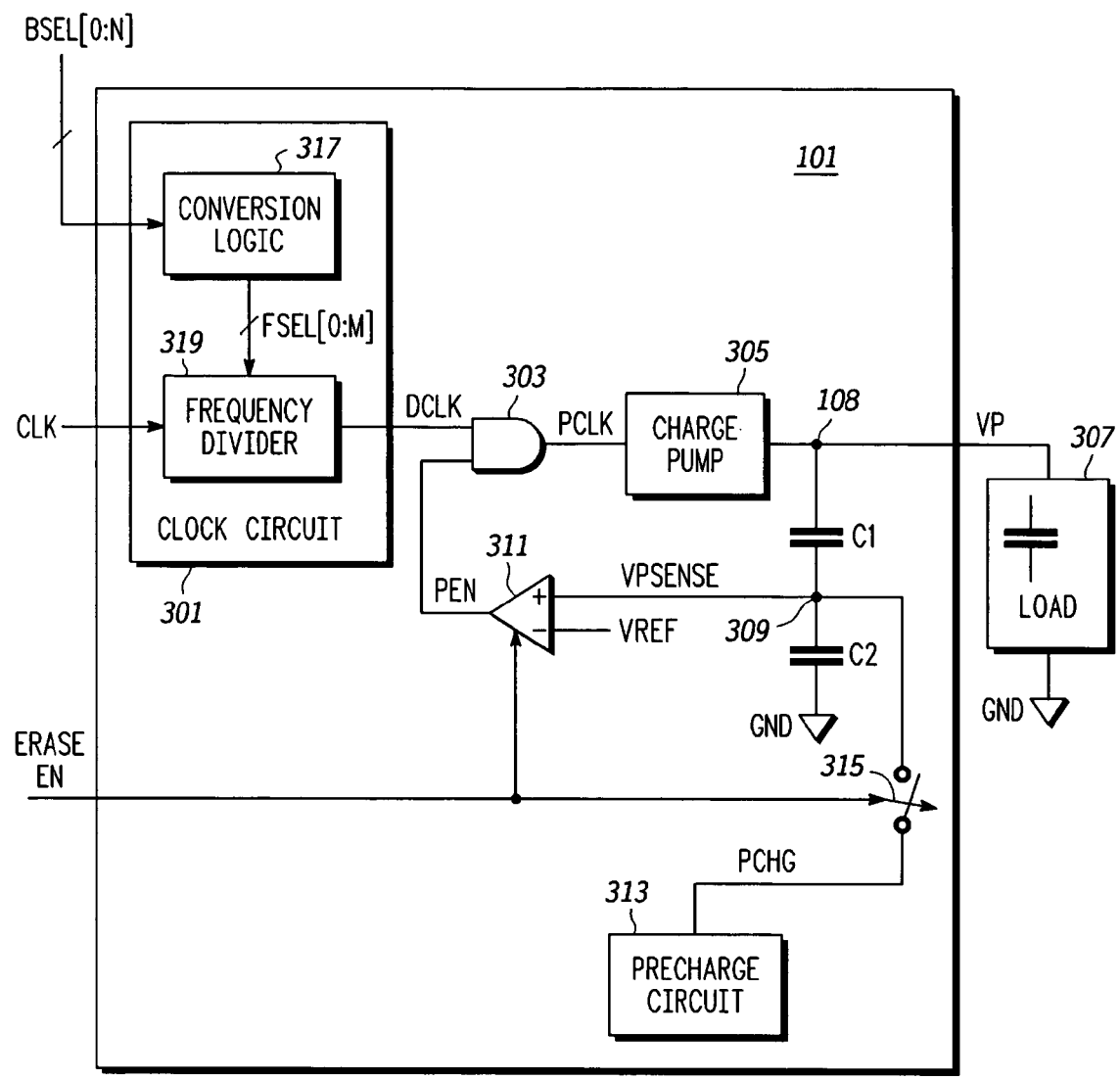
FIG. 3 is a more detailed schematic and block diagram of the charge pump system of FIG. 1 implemented according to an exemplary embodiment of the present invention.

FIG. 3 is a more detailed schematic and block diagram of the charge pump system 101 implemented according to an exemplary embodiment of the present invention. The CLK and BSEL[0:N] signals are provided to respective inputs of a clock circuit 301, which provides a clock signal DCLK, having a frequency based on BSEL[0:N], to one input of a two-input AND gate 303. The output of the AND gate 303 provides a charge pump clock signal PCLK to an input of a charge pump 305, which generates the VP signal at its output. The VP signal is shown provided to a capacitive load 307 referenced to ground (GND) via the charge node 108, where the capacitive load 307 represents the combined capacitance of selected ones of the memory blocks 103. Although multiple memory blocks 103 may be selected at the same time for an erase operation, usually only one memory block 103 is selected at a time. The charge pump output node 108 is divided by a capacitive divider C1 & C2 to form a capacitive dividing node 309. The node 309 develops a sense signal VPSENSE which is precharged to a PCHG voltage level and represents a sensed or sampled portion of the VP signal. Node 309 is also coupled to the non-inverting input of a comparator 311, having an inverting input receiving a reference voltage signal VREF. The output of the comparator 311 provides a pump enable signal PEN to the other input of the AND gate 303. The ERASE EN signal is provided to an enable input of the comparator 311 and to the control input of a switch 315, shown as a normally-closed single-pole, single-throw (SPST) switch. The switched terminals of the switch 315 are coupled between node 309 and an output of a precharge circuit 313, which provides the precharge voltage PCHG on the node 309.

In the embodiment illustrated, the clock circuit 301 includes conversion logic 317 and a frequency divider 319. The BSEL[0:N] signals are provided to respective inputs of the conversion logic 317, which provides corresponding frequency select signals FSEL[0:M] to respective inputs of the frequency divider 319. The FSEL[0:M] signals include M+1 signals or bits, where M is also a positive integer greater than zero.

In operation, the erase control logic 105 initially asserts the ERASE EN signal low (de-asserted low) disabling the output of the comparator 311 and keeping the switch 315 in the closed position. The PCHG voltage precharges the node 309 to a predetermined level, which establishes an initial level of the VPSENSE signal. While the comparator 311 is disabled, its output is tri-stated or otherwise held to a logic low level so that the PCLK remains low. A pull-down device (e.g., resistor or the like) may be used to pull PEN low when the comparator 311 is disabled. The erase control logic 105 asserts the BSEL[0:N] signals to select one or more of the memory blocks 103 for an erase operation. The BSEL[0:N] signals are converted by the conversion logic 317 to the FSEL[0:M] signals, which determine an amount (e.g., a divider or multiplier) to divide the frequency of the CLK signal to provide the DCLK signal, as further described below. The erase control logic 105 asserts the ERASE EN signal high, which enables the comparator 311 and opens the switch 315. The VPSENSE signal is initially at a higher voltage level than the VREF signal, so that the comparator 311 asserts the PEN signal high. While the PEN signal is asserted high, the DCLK signal is passed as the PCLK signal to the input of the charge pump 305. The AND gate 303 serves as enable logic to pass the DCLK signal as the PCLK signal while PEN is asserted high.

In the embodiment illustrated, the charge pump 305 pumps a negative charge onto the node 108 while the PCLK signal is high, thereby incrementally reducing the voltage of the VP signal. The VP signal thus ramps negative at a slew rate determined by the frequency of the PCLK signal as further described below. The capacitors C1 and C2 collectively form a capacitive voltage divider of the charge node 108 for tracking or otherwise sensing when the voltage of VP reaches the target voltage VNEG. The VPSENSE signal is precharged to PCHG, which is higher than VREF, and as the voltage of the VP signal ramps down, the voltage level of the VPSENSE signal also ramps down towards the voltage of the VREF signal. The comparator 311 asserts the PEN signal high until the voltage of the VPSENSE signal falls to the voltage level of VREF, so that the voltage of the VP signals falls to the target voltage level VNEG suitable for erasing the selected memory blocks 103.

It is desired to simplify the complexity and design of the comparator 311 and its supporting circuitry (e.g. timing control circuitry). For a simple and inexpensive comparator 311 with relatively slow response time, the frequency of the CLK signal, the charge pump 305, the capacitance of the capacitors C1 and C2, the voltage level of VREF and the voltage of PCHG (for the initial voltage of VPSENSE) are all selected to cause the voltage of the VP signal to ramp down from an initial value to the target voltage level VNEG within a predetermined amount of time for the highest expected capacitance of the capacitive load 307 to meet a selected performance level while also avoiding overshoot of the VP signal above the breakdown voltage level. For many floating gate non-volatile memory cells, the VP signal ramps down to approximately VNEG=−9.3 V to perform the erase function. VREF is calculated as VREF=PCHG+(C1/(C1+C2))*VNEG. In one embodiment, the capacitance of the capacitors C1 and C2 are selected so that C1/(C1+C2)=1/7, the PCHG voltage is approximately 2V, which translates to a voltage of VREF of approximately 0.67V. The frequency of the CLK signal is approximately 60 MHz, and the VP signal ramps down from approximately 0 Volts (V) to approximately VNEG=−9.3V within a predetermined amount of time with a maximum overshoot of approximately 5% for a block size of 128 KB.

Figure 4:
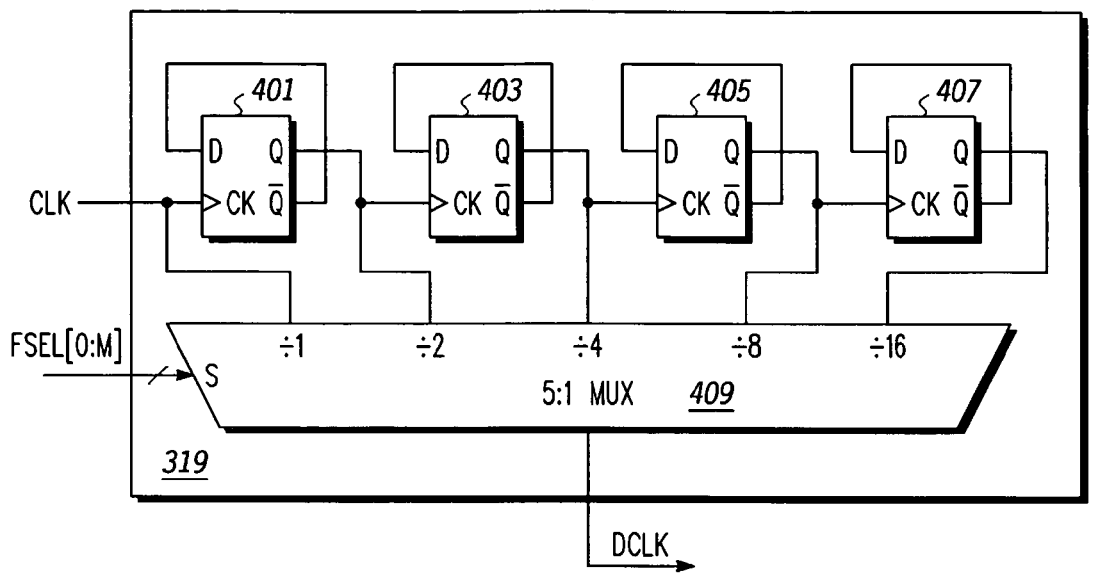
FIG. 4 is a simplified schematic and block diagram of the frequency divider of FIG. 3 implemented according to an exemplary embodiment of the present invention.

FIG. 4 is a simplified schematic and block diagram of the frequency divider 319 implemented according to an exemplary embodiment of the present invention. The CLK signal is provided to the clock input (CK) of a D-type flip-flop (DFF) 401, having an inverted Q output (shown as "Q-bar" or a Q with a bar above denoting an inverted output) coupled to its D input. The non-inverted Q output of DFF 401 is coupled to the clock input of another DFF 403, having its non-inverted Q output coupled to the clock input of another DFF 405, having its non-inverted Q output coupled to the clock input of yet another DFF 407. The inverted Q output of each of the DFFs 403, 405 and 407 is fed back to its D input. In this manner, the Q output of DFF 401 is a clock signal with half (½) the frequency of CLK, the Q output of DFF 403 is a clock signal with one-fourth (¼) the frequency of CLK, the Q output of DFF 405 is a clock signal with one-eighth (⅛) the frequency of CLK, and the Q output of DFF 407 is a clock signal with one-sixteenth (1/16) the frequency of CLK. The CLK signal and the output of each of the DFFs 401-407 are coupled to respective inputs of a 5:1 multiplexer (MUX) 409, having an output providing the divided clock signal DCLK. The MUX 409 has select inputs S receiving the FSEL[0:M] signals. In the illustrated embodiment in which the MUX 409 has eight or less data inputs, the FSEL[0:M] signals include three bits (e.g., M=2) for selecting one of the clock signals provided to the data inputs of the MUX 409 as the DCLK output. It is noted that any number of DFFs (less than or greater than 4) may be included for dividing the CLK signal any number of times as needed for the memory system 100. As understood by those skilled in the art, the FSEL[0:M] signals include the appropriate number of bits for selecting the appropriate frequency of the DCLK signal.

In operation, the erase control logic 105 asserts the BSEL[0:N] signals for selecting one (or more) of the memory blocks 103. The conversion logic 317 converts the BSEL[0:N] signals to the FSEL[0:M] signals appropriate for selecting the appropriate frequency of the DCLK signal for controlling the slew rate of the VP signal. The erase control logic 105 also asserts the ERASE EN signal to open the switch 315 and to enable the comparator 311 as previously described. The PEN signal is asserted high so that the DCLK signal is passed as the PCLK signal to the input of the charge pump 305 until VPSENSE falls to VREF. The charge pump 305 pumps charge onto the combined capacitance of the charge node 108 (coupled to the capacitive load 307) while PCLK is high, so that the VP signal ramps down. The rate of discharge of the capacitive load 307, and thus the slope of the VP signal, is dependent upon the frequency of the PCLK signal. And the frequency of the PCLK signal is determined by the frequency of the CLK signal and the state of the frequency divider 319.

The conversion logic 317 may be implemented in any one of several ways. In one embodiment, the conversion logic 317 incorporates calculation logic or code, such as to calculate or otherwise determine the total capacitance of the capacitive load 307 and to assert the FSEL[0:M] signals to divide the frequency of the CLK signal by the corresponding amount to adjust the slew rate of the VP signal. In another embodiment, the conversion logic 317 is a memory device (not shown), such as a lookup table (LUT) or the like, in which the BSEL[0:N] signals serve as an input address and the value of the FSEL[0:M] signals provides the corresponding output data. In the LUT case, the frequency select values (as indicated by corresponding values of the FSEL[0:M] signals) are predetermined and stored in the LUT, each corresponding to the expected capacitive load combinations (as indicated by the BSEL[0:N] signals).

It is appreciated that the clock circuit 301 may be implemented according to any one of many methods. In general, the clock circuit 301 converts the BSEL[0:N] signals to the DCLK signal with the appropriate frequency to charge the node 108 at the desired slew rate. Since the capacitive load of each of the memory blocks 103 is known, the combined capacitance of the capacitive load 307 is easily determined based on the selected memory blocks 103 as indicated by the BSEL[0:N] signals. In one embodiment, the clock circuit 301 is implemented as a state machine or the like which calculates the combined capacitance of the capacitive load 307 based on the selected memory blocks 103 as indicated by the BSEL[0:N] signals, and which provides a clocks signal with the appropriate frequency. The clock circuit 301 is implemented to adjust the frequency of an input clock signal (e.g., CLK) or otherwise to generate the DCLK signal with the appropriate frequency. Alternatively, the conversion logic 317 is implemented with the state machine logic and provides the FSEL[0:M] signals to select the appropriate frequency of the DCLK signal.

Figure 5:
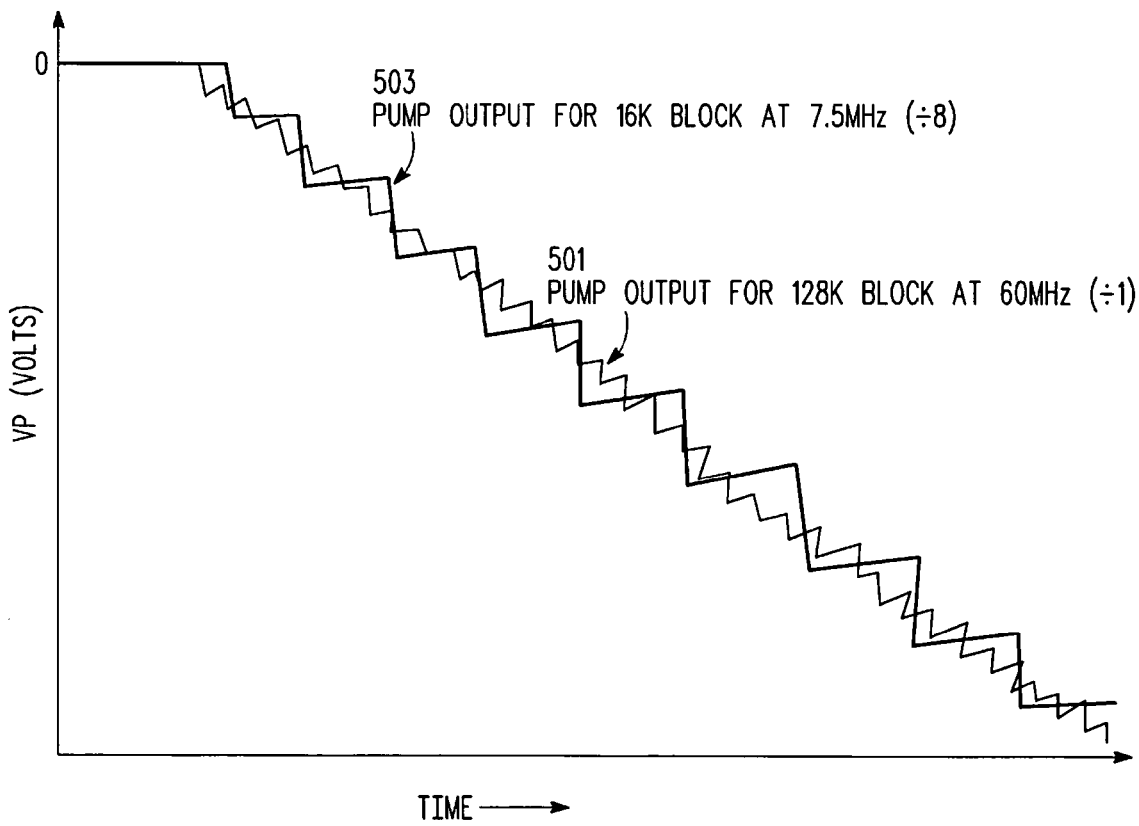
FIG. 5 is a simplified graphic diagram illustrating the stairstep ramp waveform of the VP signal for the 128 KB memory block when the PCLK signal is at 60 MHz (divide by 1 or when the frequency of PCLK is equal to CLK) and the stairstep ramp waveform for the 16 KB memory block when the PCLK signal is at 7.5 MHz (divide by 8).

FIG. 5 is a simplified graphic diagram illustrating the stairstep ramp waveform 501 of the VP signal for the 128 KB memory block when the PCLK signal is at 60 MHz (divide by 1 or when the frequency of PCLK is equal to CLK) and the stairstep ramp waveform 503 for the 16 KB memory block when the PCLK signal is at 7.5 MHz (divide by 8). In this case, the BSEL[0:N] signals are asserted to select the largest memory block (e.g., 128 KB) and the conversion logic 317 asserts the FSEL[0:M] signals to select the first input of the MUX 409 so that the DCLK signal has the same frequency as the CLK signal (e.g., divide by 1) as shown by ramp waveform 501. For the ramp waveform 503, the BSEL[0:N] signals are asserted to select the smallest memory block (e.g., 16 KB, ignoring the 1 KB test block) and the conversion logic 317 asserts the FSEL[0:M] signals to select the fourth input of the MUX 409 to divide the frequency of the CLK signal by eight. In this manner, it is illustrated that when the capacitance of the capacitive load 307 is decreased by a particular factor, the frequency of the PCLK signal driving the charge pump 305 is decreased by roughly the same factor so that the slew rate or slope of the ramp waveform is roughly the same.

In general, the smaller memory blocks take larger voltage steps because the amount of charge of the charge pump 305 represents a larger percentage of the capacitive load 307. Thus, the incremental discharge of the slower clock signal is significantly greater than the incremental discharge of the faster clock, whereas the slew rates of the respective ramp signals are roughly equivalent. It is appreciated that performance of the memory device is based on timing for the erase operation of the largest memory block or combination of blocks. There is no performance to be gained by fast ramps for the smaller memory blocks or combinations, so that the slew rate of the ramp may be slowed down without any penalty of performance.

A charge pump system according to an embodiment of the present invention includes a clock circuit and a charge pump circuit. The clock circuit provides a first clock with a frequency based on a memory block select signal indicative of load capacitance of a charge node. The charge pump circuit has an input receiving the first clock and an output which charges the charge node at a rate based on the frequency of the first clock and the load capacitance of the charge node. The memory block select signal indicates which of the memory blocks that are coupled to the charge node and thus indicates the load capacitance. The frequency of the first clock is adjusted based on the load capacitance so that the slew rate of the charge node is about the same for the expected combinations of load capacitance.

The clock circuit may include conversion logic which converts the memory block select signal to a frequency select signal and a frequency divider which converts an input clock to the first clock based on the frequency select signal. The frequency divider may be implemented with series-coupled flip-flops and select logic. The series-coupled flip-flops have an input receiving the input clock and multiple outputs providing multiple divided clocks. The select logic has a data input for each output of flip-flops, a select input receiving the frequency select signal, and an output providing the first clock. The conversion logic may be implemented as a memory (e.g., lookup table or the like) programmed with multiple frequency select signals.

The clock logic may be configured to determine the load capacitance of the charge node based on the memory block select signal. The charge pump circuit may include enable logic, a charge pump and a comparator circuit. The enable logic has a first input receiving the first clock, a second input receiving an enable signal, and an output providing a pump clock. The charge pump has an input receiving the pump clock and an output coupled to the charge node. The comparator circuit has an input coupled to the charge node and an output providing the enable signal. In one embodiment, the comparator circuit includes a capacitive voltage divider coupled to the charge node and has a sense node and a comparator having an input coupled to the sense node and an output providing the enable signal.

An integrated circuit (IC) according to an embodiment of the present invention includes multiple memory blocks, each having a different sizes, a control circuit which provides a memory block select to selectively couple a charge node to selected ones of the memory blocks, and a charge pump system. The charge pump system includes clock logic which provides a first clock with a frequency based on the memory block select and a charge pump circuit which charges the charge node at a rate based on the frequency of the first clock.

The memory blocks may be implemented as blocks of floating gate non-volatile memory cells. The clock logic may include conversion logic which converts the memory block select to a frequency select and a frequency divider which divides a frequency of an input clock to provide multiple divided clock signals and which selects from among the divided clock signals based on the frequency select. The conversion logic may be implemented as a memory programmed with multiple frequency select values. The clock logic may be configured to determine a combined capacitance of selected memory blocks coupled to the charge node.

The charge pump circuit may include a charge pump having an input receiving a pump clock and an output coupled to the charge node, a comparator circuit having an input coupled to the charge node and an output providing an enable signal, and enable logic having inputs receiving the enable signal and the first clock and an output providing the pump clock. In this embodiment, the IC comparator circuit may include a capacitive voltage divider and a comparator. The capacitive voltage divider is coupled to the charge node and has a sense node. The comparator has an input coupled to the sense node and an output providing the enable signal.

A method of controlling slew rate of a charge pump according to an embodiment of the present invention includes coupling a voltage node to selected memory blocks based on a memory block select, providing a first clock at a frequency based on the memory block select, and pumping charge to the voltage node at a rate determined by the frequency of the first clock. The method may include converting the memory block select to a frequency select, providing multiple second clocks with different frequencies based on an input clock, and selecting one of the second clocks as the first clock based on the frequency select. The method may include dividing a frequency of the input clock. The method may include determining load capacitance of the voltage node based on combined capacitance of the selected memory blocks. The method may include comparing a voltage of the voltage node with a predetermined voltage to provide an enable signal indicative thereof, providing the first clock as a pump clock while the enable signal is provided, and pumping charge into the voltage node while the pump clock is provided. The method may include sensing the voltage of the voltage node and providing a sense voltage and comparing the sense voltage with a reference level to provide the enable signal indicative thereof.

While particular embodiments of the present invention have been shown and described, it will be block recognized to those skilled in the art that, based upon the teachings herein, further changes and modifications may be made without departing from this invention and its broader aspects. The appended claims are intended to encompass within their scope all such changes and modifications as are within the true spirit and scope of this invention.

The invention claimed is:

1. A charge pump system, comprising:
    a clock circuit which provides a first clock with a frequency based on a memory block select signal indicative of load capacitance of a charge node; and
    a charge pump circuit having an input receiving said first clock and an output which charges said charge node at a rate based on said frequency of said first clock and said load capacitance of said charge node, wherein said charge pump circuit comprises:
        enable logic having a first input receiving said first clock, a second input receiving an enable signal, and an output providing a pump clock;
        a charge pump having an input receiving said pump clock and an output coupled to said charge node; and
        a comparator circuit having an input coupled to said charge node and an output providing said enable signal.

2. The charge pump system of claim 1, wherein said clock circuit comprises:
    conversion logic which converts said memory block select signal to a frequency select signal; and
    a frequency divider which converts an input clock to said first clock based on said frequency select signal.

3. The charge pump system of claim 2, wherein said frequency divider comprises:
    a plurality of series-coupled flip-flops having an input receiving said input clock and a plurality of outputs providing a plurality of divided clocks; and
    select logic having a plurality of data inputs coupled to said plurality of outputs of said plurality of series-coupled flip-flops, a select input receiving said frequency select signal, and an output providing said first clock.

4. The charge pump system of claim 2, wherein said conversion logic comprises a memory programmed with a plurality of frequency select signals.

5. The charge pump system of claim 1, wherein said clock circuit determines said load capacitance of said charge node based on said memory block select signal.

6. The charge pump system of claim 1, wherein said comparator circuit comprises:
    a capacitive voltage divider coupled to said charge node and having a sense node; and
    a comparator having an input coupled to said sense node and an output providing said enable signal.

7. An integrated circuit (IC), comprising:
    a plurality of memory blocks, each having a corresponding one of a plurality of sizes;
    a control circuit which provides a memory block select to selectively couple a charge node to selected ones of said plurality of memory blocks; and
    a charge pump system, comprising:
        clock logic which provides a first clock with a frequency based on said memory block select; and
        a charge pump circuit which charges said charge node at a rate based on said frequency of said first clock, wherein said charge pump circuit comprises:
            a charge pump having an input receiving a pump clock and an output coupled to said charge node;
            a comparator circuit having an input coupled to said charge node and an output providing an enable signal; and
            enable logic having inputs receiving said enable signal and said first clock and an output providing said pump clock.

8. The IC of claim 7, wherein each of said plurality of memory blocks comprises a block of floating gate non-volatile memory cells.

9. The IC of claim 7, wherein said clock logic comprises:
    conversion logic which converts said memory block select to a frequency select; and
    a frequency divider which divides a frequency of an input clock to provide a plurality of divided clock signals and which selects from among said plurality of divided clock signals based on said frequency select.

10. The IC of claim 9, wherein said conversion logic comprises a memory programmed with a plurality of frequency select values.

11. The IC of claim 7, wherein said clock logic determines a combined capacitance of said selected ones of said plurality of memory blocks coupled to said charge node.

12. The IC of claim 7, wherein said comparator circuit comprises:
    a capacitive voltage divider coupled to said charge node and having a sense node; and
    a comparator having an input coupled to said sense node and an output providing said enable signal.

13. A method of controlling slew rate of a charge pump, comprising:
    coupling a voltage node to selected ones of a plurality of memory blocks based on a memory block select;
    providing a first clock at a frequency based on the memory block select;
    comparing a voltage of the voltage node with a predetermined voltage to provide an enable signal indicative thereof;
    providing the first clock as a pump clock while the enable signal is provided; and
    pumping charge into the voltage node while the pump clock is provided.

14. The method of claim 13, wherein said providing a first clock comprises:
    converting the memory block select to a frequency select;
    providing a plurality of second clocks with different frequencies based on an input clock; and selecting, based on the frequency select, one of the plurality of second clocks as the first clock.

15. The method of claim 14, wherein said providing a plurality of second clocks comprises dividing a frequency of the input clock.

16. The method of claim 13, wherein said providing a first clock comprises determining load capacitance of the voltage node based on combined capacitance of the selected ones of a plurality of memory blocks.

17. The method of claim 13, wherein said comparing a level of the voltage node with a predetermined level comprises:

sensing the voltage of the voltage node and providing a sense voltage; and comparing the sense voltage with a reference level to provide the enable signal indicative thereof.

* * * * *

UNITED STATES PATENT AND TRADEMARK OFFICE
CERTIFICATE OF CORRECTION

| | | |
|---|---|---|
| PATENT NO. | : 7,348,829 B2 | Page 1 of 1 |
| APPLICATION NO. | : 11/388396 | |
| DATED | : March 25, 2008 | |
| INVENTOR(S) | : Jon S. Choy and Tahmina Akhter | |

It is certified that error appears in the above-identified patent and that said Letters Patent is hereby corrected as shown below:

Title page, Item (73) "Assignee" should read:

FREESCALE SEMICONDUCTOR, INC.    AUSTIN, TX (US)

Signed and Sealed this

Fourteenth Day of April, 2009

JOHN DOLL
*Acting Director of the United States Patent and Trademark Office*